United States Patent
Hsu

(10) Patent No.: US 9,158,758 B2
(45) Date of Patent: Oct. 13, 2015

(54) RETRIEVAL OF PREFIX COMPLETIONS BY WAY OF WALKING NODES OF A TRIE DATA STRUCTURE

(75) Inventor: Bo-June Hsu, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 80 days.

(21) Appl. No.: 13/345,750

(22) Filed: Jan. 9, 2012

(65) Prior Publication Data

US 2013/0179419 A1    Jul. 11, 2013

(51) Int. Cl.
*G06F 17/30* (2006.01)
*G06F 17/27* (2006.01)

(52) U.S. Cl.
CPC ........ *G06F 17/276* (2013.01); *G06F 17/30327* (2013.01)

(58) Field of Classification Search
CPC .......................... G06F 17/30327; G06F 17/276
USPC ......................................................... 707/797
See application file for complete search history.

(56) References Cited

U.S. PATENT DOCUMENTS

| | | | |
|---|---|---|---|
| 6,694,323 B2 * | 2/2004 | Bumbulis ................ 707/999.101 |
| 7,478,109 B1 * | 1/2009 | Panigrahy et al. ..... 707/999.006 |
| 7,519,611 B2 | 4/2009 | Avadhanam et al. | |
| 7,539,153 B1 * | 5/2009 | Liang et al. ................... 370/255 |
| 7,609,179 B2 | 10/2009 | Diaz-Gutierrez et al. | |
| 7,702,640 B1 * | 4/2010 | Vermeulen et al. ........ 707/999.1 |
| 8,380,758 B1 * | 2/2013 | Stephens ....................... 707/803 |
| 2009/0248725 A1 * | 10/2009 | Bhattacharjee et al. ...... 707/101 |
| 2009/0254819 A1 | 10/2009 | Song et al. | |
| 2012/0029910 A1 * | 2/2012 | Medlock et al. .................. 704/9 |

OTHER PUBLICATIONS

Surajit Chaudhuri & Raghav Kaushik, "Extending Autocompletion to Tolerate Errors", SIGMOD (2009), 12 pages.*
Igor Ostrovsky, "Efficient Auto-Complete With a Ternary Search Tree", weblog posted Aug. 30, 2009, 12 pages.*
Duan, et al., "Online Spelling Correction for Query Completion", Retrieved at <<http://research.microsoft.com/pubs/148103WWW11-OnlineSpellingCorrection.pdf>>, Proceedings of the 20th International World Wide Web Conference, Mar. 28-Apr. 1, 2011, pp. 1-10.
Gelbukh, Alexander, "Exact and Approximate Prefix Search under Access Locality Requirements for Morphological Analysis and Spelling Correction", Retrieved at <<http://www.scielo.org.mx/pdf/cys/v6n3/v6n3a2.pdf>>, Computación y Sistemas, vol. 6, No. 3, Mar. 18, 2003, pp. 167-182.

(Continued)

*Primary Examiner* — Scott A Waldron
(74) *Attorney, Agent, or Firm* — Steve Wight; Judy Yee; Micky Minhas

(57) ABSTRACT

Technologies pertaining to providing completions to proffered prefixes are disclosed herein. A suggested completion to a proffered prefix is retrieved by walking nodes of a trie data structure, wherein a node includes one or more characters that are used to extend a character sequence represented by its parent. Each node in the trie data structure is assigned a score, wherein the score maps to a best score assigned to its descendants. The nodes of the trie data structure are sorted based upon score, and the nodes are walked based upon scores assigned thereto.

20 Claims, 8 Drawing Sheets

(56) References Cited

OTHER PUBLICATIONS

Wang, et al., "A Fast and Accurate Method for Approximate String Search", Retrieved at <<http://aclweb.org/anthology/P/P11/P11-1006.pdf>>, Proceedings of the 49th Annual Meeting of the Association for Computational Linguistics, Jun. 19-24, 2011, pp. 52-61.

Ostrovsky, Igor, "Efficient Auto-Complete with a Ternary Search Tree", Retrieved at <<http://igoro.com/archive/efficient-auto-complete-with-a-ternary-search-tree/>>, Retrieved Date: Sep. 28, 2011, pp. 1-10.

Martins, et al., "Spelling Correction for Search Engine Queries", Retrieved at <<http://xldb.fc.ul.pt/xldb/publications/spellcheck.pdf>>, 2004, Proceedings of EsTAL, España for Natural Language Processing, 2004, pp. 1-12.

* cited by examiner

RETRIEVAL OF PREFIX COMPLETIONS BY WAY OF WALKING NODES OF A TRIE DATA STRUCTURE

BACKGROUND

As data storage devices are becoming less expensive, an increasing amount of data is retained, wherein such data can be accessed through utilization of a search engine. Accordingly, search engine technology is frequently updated to satisfy information retrieval requests of a user. Moreover, as users continue to interact with search engines, such users become increasingly adept at crafting queries that are likely to cause search results to be returned that satisfy informational requests of the users.

Conventional search engines have been adapted to assist a user in locating information pertaining to informational goals of the user by providing the user with suggested queries responsive to the user proffering a query to a search engine. There are a variety of different approaches that are employed by conventional search engines to set forth suggested queries.

Search engines have also been adapted to assist a user with query completions. A user can provide a query prefix to a search engine, wherein the query prefix includes an alphanumerical character or a sequence of alphanumerical characters. Optionally, the query prefix can also or alternatively include punctuation or other lexical symbols. Responsive to receiving the prefix, the search engine outputs one or more suggested query completions to the query prefix, and the user can select a suggested query completion for provision to the search engine. The search engine subsequently executes a search using the suggested query completion as a query. Query completions have been found to assist users in formulating queries, as the user can analyze suggested completions and select one that the user feels is best suited for her informational needs.

As mobile computing devices have continued to become increasingly prevalent, the importance of providing completions to prefixes has likewise increased. Mobile telephones are configured with robust applications that perform a task based upon input received from a user, wherein, in some circumstances, the input is textual. Due to small sizes of the mobile telephones, however, a physical keyboard is often not provided, rendering it time-consuming to provide textual input (particularly if there are numerous characters to be entered). The automatic provision of completions to a prefix saves the user time and angst (e.g., caused by accidentally entering incorrect characters) by providing the user with suggested completions to a proffered prefix. Conventional solutions for providing completions to a prefix, however, are not space efficient.

SUMMARY

The following is a brief summary of subject matter that is described in greater detail herein. This summary is not intended to be limiting as to the scope of the claims.

Described herein are various technologies pertaining to generating completions to provided prefixes through utilization of a space efficient trie data structure. While the description herein is generally directed towards completions to prefixes, one skilled in the art will ascertain that the trie data structure described herein may also be employed for utilization in connection with query de-duplication, spelling correction, query normalization, and the like. In an exemplary embodiment, a prefix is received, wherein the prefix includes zero or more alphanumerical characters. Responsive to receipt of the prefix, a search can be executed over a trie data structure, and a completion to the prefix can be returned by walking nodes of the trie data structure.

An exemplary trie data structure described herein comprises a plurality of hierarchically arranged nodes (a tree of nodes), wherein each node in the trie data structure includes zero or more characters. The characters in a node indicate extensions of character(s) in its parents. Each node in the trie data structure is additionally assigned a score, wherein the score is indicative of a desirability of a most desirable completion represented by its descendant nodes. Accordingly, leaf nodes (nodes with no children) represent potential completions, and the scores assigned to the leaf nodes are indicative of desirability of the potential completions respectively represented thereby. In an exemplary embodiment, the desirability of a potential completion may be based upon historical utilization of such completion with respect to a computer-executable application. For instance, if the trie data structure is employed to generate query completions for provision to a search engine, the desirability of a potential query completion may be based upon frequency of issuance of the query completion as a query to the search engine.

Intermediate nodes (nodes in the hierarchy of nodes between the root node and the leaf nodes) comprise one or more characters that extend partial completions, if any, represented by their respective parents. Each intermediate node is also assigned a score that corresponds to a score assigned to its descendant leaf node that represents a most desirable completion. For example, lower scores can represent more desirable completions. An exemplary intermediate node may have two descendant leaf nodes, where a first of such leaf nodes is assigned a score of one and a second of such leaf nodes is assigned a score of three. In such an example, the intermediate node is assigned a score of one, as it corresponds to the lowest score assigned to its descendant leaf nodes. Thus, each intermediate node is assigned a score that maps to a "best" score assigned amongst its descendant leaf nodes.

Furthermore, nodes in the trie data structure can be sorted based upon scores assigned thereto. Such sorting of nodes based upon scores enhances efficiency of searching for a completion using the trie data structure, as typically only a sub-branch of the trie data structure need be analyzed to locate a most desirable completion for a given prefix. In other words, in memory of a computing device, the trie data structure is sorted from best (e.g., lowest) scores to worst (e.g., highest) scores, thereby allowing a most desirable completion to be located via identifying an intermediate node in the trie data structure that corresponds to a proffered prefix and thereafter walking nodes of the sub-branch of the trie data structure beneath the located intermediate node until the leaf node assigned the best score is reached. Such searching can be extended for more than one completion, as next best scores can be monitored when walking the nodes of the trie. Efficiency can be further enhanced by lazily placing nodes in a priority queue, such that only a first child node of a node corresponding to a proffered prefix is placed in the priority queue while its sibling(s) are not placed in the priority queue until the first child has been retrieved therefrom.

Additionally, as will be described in greater detail below, size of the trie data structure can be reduced by differentially encoding scores assigned to nodes (e.g., encoding scores of sibling nodes as relative scores with respect to the previous sibling nodes or parent nodes). For instance, if a first node is assigned a score of four and its sibling (a second node) is assigned a score of six, then the score assigned to the first node can be zero (as its parent is also assigned a score of four) and the score assigned to the second node can be two. This effectively reduces an amount of computer-readable storage needed to retain the trie data structure, as many scores assigned to nodes are caused to be zero or some other relatively small number. Accordingly, a relatively small number of bytes (if any) is needed to retain the scores. Furthermore, differential encoding can be employed when storing offsets to locations in memory of respective nodes. In an example, nodes in the trie data structure can be stored such that they are adjacent to their siblings in memory and arranged in depth first order. In comparison to breadth first ordering, a distance in memory between a parent node and its children is generally reduced, thereby effectively reducing a number of cache misses that occur when searching the trie data structure and further generally reducing an amount of space in memory between a parent node and its children. Therefore, when differential encoding is employed to define offsets between nodes, a number of bytes needed to represent such offsets is effectively reduced, further reducing size of the trie data structure.

Other aspects will be appreciated upon reading and understanding the attached figures and description.

DETAILED DESCRIPTION

Figure 1:
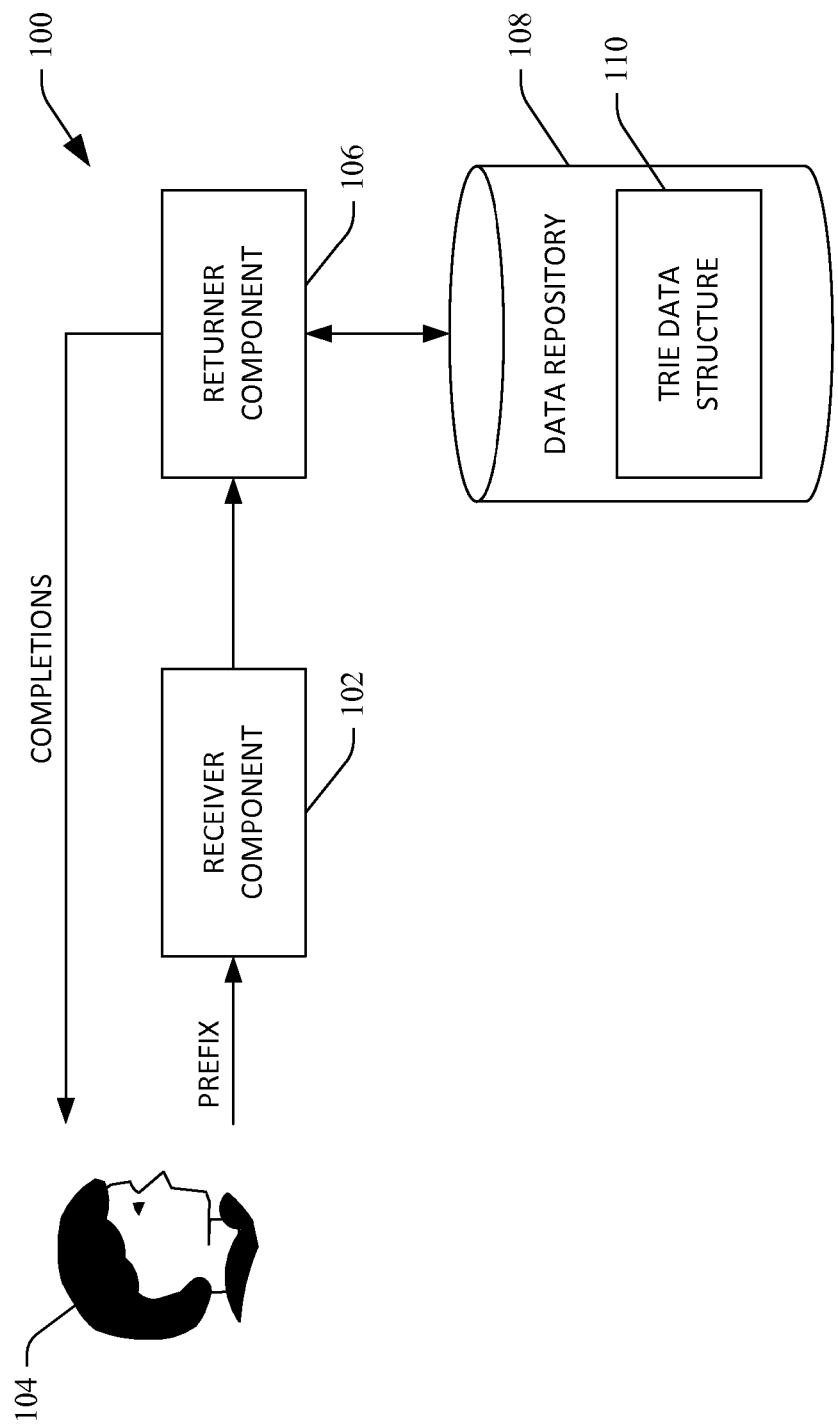
FIG. 1 is a functional block diagram of an exemplary system that facilitates retrieving a completion responsive to receipt of a prefix.

Various technologies pertaining to automatically locating a completion of a proffered prefix will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary system 100 that facilitates retrieving a suggested completion responsive to receipt of a prefix is illustrated. While the system 100 is shown and described as retrieving a completion responsive to receipt of a prefix, it is to be understood that the system 100 can be employed in connection with spelling correction, phrase de-duplication, query normalization, and the like. It is thus to be understood that the description herein is not intended to limit the scope of the claims to provision of a completion responsive to receipt of a prefix.

In an exemplary embodiment, the system 100 can be employed in connection with a search engine to provide a user with a query suggestion responsive to the user entering a query prefix (zero or more characters or symbols) into a query field. For instance, the user can be provided with a plurality of suggested query completions responsive to receipt of a query prefix from the user, and the user can optionally select one of the provided suggested query completions. Responsive to the user selecting a suggested query completion, the suggested query completion can be provided to the search engine, which can in turn execute a search over an index utilizing the selected suggested query completion.

In another exemplary embodiment, the system 100 can be employed in connection with a mobile computing device to provide suggested completions to prefixes provided to an operating system of the mobile computing device or an application executing thereon. Accordingly, a user can be provided with suggested completions to a prefix that includes a relatively small number of characters entered by the user, for example, through a touch-sensitive display. In still yet another exemplary embodiment, the system 100 can be employed in connection with providing a suggested completion to a portion of a URL of a web page proffered by a user to a web browser. Specifically, the user can begin entering text into a URL field of the web browser, and the system 100 can be employed to both provide suggested completions to the proffered text as well as place the suggested completion in an appropriate form to allow the web browser to retrieve content from the URL desirably set forth by the user. Accordingly, the system 100 may be comprised by a server that is accessible by way of an application executing on a client computing device or may be comprised by a client computing device.

The system 100 comprises a receiver component 102 that receives a prefix from a user 104. The prefix can be in the form of alphanumerical characters proffered to a computing device by the user 104. In another exemplary embodiment, the prefix may be in the form of spoken words set forth by the user 104. In still yet another exemplary embodiment, the prefix can be in the form of gestures made by the user 104, which can be interpreted via image analysis technologies.

The system 100 further comprises a returner component 106 that is in communication with the receiver component 102 and executes a search based upon the prefix. In more detail, the system 100 includes a data repository 108 that comprises a trie data structure 110. The returner component 106, responsive to receiving the prefix, accesses the trie data structure 110 in the data repository 108 and executes a search over such trie data structure 110. The returner component 106 then outputs one or more suggested completions to the prefix and provides such suggested completions to the user 104. For instance, the suggested completions may be provided to the user 104 in the form of selectable suggested completions, such that selection of a suggested completion by the user 104 causes the selected suggested completion to be provided to a particular computer-executable application as input, The trie data structure 110 comprises a plurality of hierarchically arranged nodes, wherein a subset of the nodes comprise one or more characters and descendants of nodes which represent extensions to character sequences represented by their respective parents. With more particularity, the trie data structure 110 comprises a root node. The trie data structure 110 further comprises a plurality of leaf nodes that are descendants of the root node. The leaf nodes in the trie data structure 110 represent a plurality of potential completions that can be provided to the user 104 responsive to the user 104 proffering a prefix. Furthermore, each leaf node in the plurality of leaf nodes has a respective score assigned thereto that is indicative of a desirability of its corresponding completion. In the examples set forth herein, the more desirable a completion, the lower the score. For instance, if a leaf node that is representative of the completion "ABCD" is assigned a score of one, then such completion is more desirable than the completion "ABCE", which is represented by a leaf node that is assigned a score of two. Other embodiments are also contemplated, such as where a higher score is indicative of a more desirable completion, and a lower score is indicative of a less desirable completion. The scores assigned to leaf nodes that represent completions can be generated based upon any suitable metric. For instance, with respect to query completions, scores assigned to leaf nodes that are representative of query completions can be based upon popularity of respective query completions (a more frequently issued query will be assigned a more desirable score as a query completion).

The trie data structure 110 further comprises a plurality of intermediate nodes, wherein each intermediate node is a descendent of the root node. Each of the intermediate nodes comprises at least one character, which extends character sequences represented by its respective parent nodes. Therefore, if a first intermediate node comprises the character "B" and a child of the first intermediate node comprises the character "C", the child of the first intermediate node represents the partial completion "BC". Moreover, each intermediate node in the trie data structure 110 is assigned a respective score that equals a score assigned to a descendent leaf node that represents the most desirable completion from amongst all descendant leaf nodes of the intermediate node. In an example, an intermediate node may have four descendent leaf nodes, which are assigned scores of 1, 2, 5, and 6, respectively. In such case, the intermediate node is assigned a score of 1 (the lowest score from amongst all its descendant leaf nodes).

The returner component 106 can utilize such scores to locate suggested completions. Specifically, the returner component 106 can receive the prefix from the user 104 and locate an intermediate node in the trie data structure 110 that represents the prefix. The returner component 106 can then walk descendants of such intermediate node based upon scores assigned thereto, resulting in location and retrieval of a top threshold number of completions for the prefix without (potentially) exhaustively reviewing each descendent of the intermediate node that represents the proffered prefix. Additionally, the trie data structure 110 can be stored in the data repository 108 such that nodes of the trie data structure 110 are sorted based upon scores assigned thereto. This is in contrast to conventional approaches, where nodes are arranged in the data repository or memory in alphabetical order of characters represented by the nodes. In an exemplary embodiment, the nodes of the trie data structure 110 can be stored in the data repository 108 in depth first order, such that descendants of nodes are retained in memory relatively proximate to their respective parent nodes. Specifically, and as will be shown below, sibling nodes are retained adjacent to one another in the data repository 108 and thereafter children of the nodes are retained in depth first order.

Still further, scores assigned to nodes in the trie data structure 110 can be differentially encoded, such that a score assigned to a node is relative to a score assigned to its previous sibling or parent. Thus, the first node in each set of sibling nodes in the trie data structure 110 is assigned a differential score of zero, as its parent is assigned the lowest score among its descendants, while scores of the subsequent sibling nodes in sorted order are differentially encoded based upon the score assigned to the previous sibling with a lower score. Differential encoding in this manner drives many scores in the trie data structure 110 to zero, and effectively reduces other scores assigned to other nodes. Consequently, an amount of memory required to store the scores (and thus the amount of memory required to store the trie data structure 110) is effectively reduced, which in turn reduces a number of cache misses when the returner component 106 is searching the trie data structure 110.

Moreover, at least some nodes in the trie data structure 110 include pointers to other nodes, wherein such pointers are employed by the returner component 106 to walk nodes of the trie data structure 110. In an exemplary embodiment, a node includes a pointer to its immediate child node assigned a lowest score amongst all immediate child nodes of such node. These pointers can be differentially encoded, such that the value of a pointer in a node is an offset from the pointer of its parent node or the first child node of its parent's previous sibling node. As, in memory, children nodes are placed relatively proximate to their respective parent nodes and previous cousin nodes, the differentially encoded offsets are relatively small. This again further reduces size of the trie data structure 110.

Figure 2:
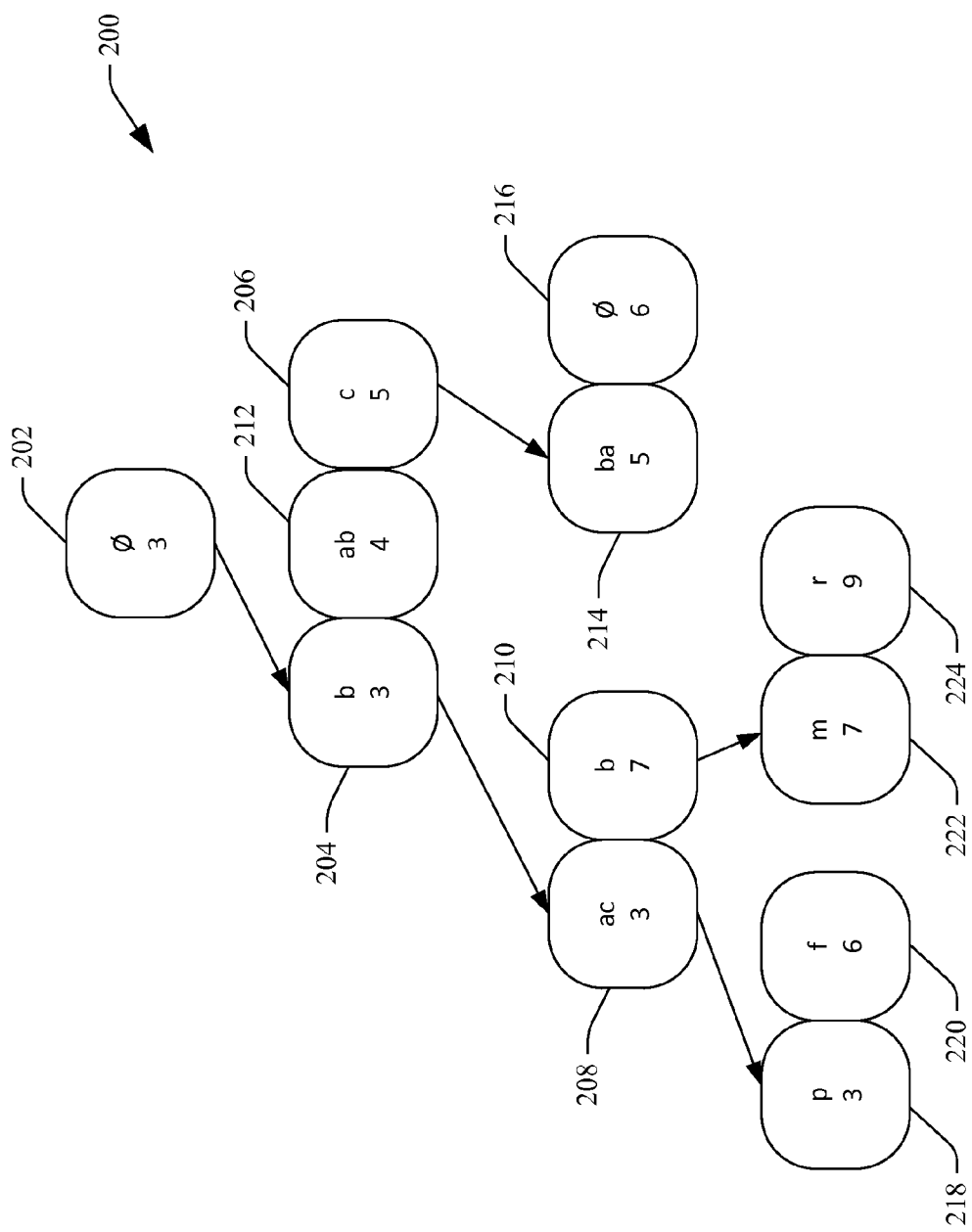
FIG. 2 illustrates an exemplary trie data structure.

With reference now to FIG. 2, an exemplary trie data structure 200 is illustrated. The trie data structure 200 comprises a root node 202. In this example, the root node 202 is empty (fails to include a character, as represented by Ø). The trie data structure 200 further comprises a plurality of intermediate nodes 204-210. The intermediate node 204 comprises the character "B", and thus represents the prefix "B". Similarly, the intermediate node 206, which is a direct descendent from the root node 202, comprises the character "C", and therefore represents the prefix "C". The intermediate node 208 is a descendent from the intermediate node 204 and comprises the characters "AC". Accordingly, the intermediate node 208 represents the prefix "BAC". Similarly, the intermediate node 210 is a direct descendent of the intermediate node 204 and comprises the character "B", thus representing the prefix "BB".

The trie data structure 200 additionally comprises a plurality of leaf nodes 212-224. As will be understood by one skilled in the art, the leaf nodes 212-224, respectively, have no children. The leaf node 212 comprises the characters "AB", and thus represents the query completion "AB". Similarly, the leaf node 214 comprises the characters "BA", which extends the prefix represented by its parents to "CBA". The leaf node 216 comprises an Ø character that indicates that there is no extension to the prefix represented by its parent (node 206). Thus, the completion represented by the leaf node 216 is "C". The Ø character is used in leaf nodes to ensure that completions are represented by leaf nodes and leaf nodes represent completions.

The leaf node 218 is a descendent from the intermediate node 208, and therefore represents the completion "BACP". Likewise, the leaf node 220 represents the completion "BACF". The leaf nodes 222 and 224 are children of the intermediate node 210, and thus represent the completions "BBM" and "BBR", respectively.

As has been described above, each of the leaf nodes 212-224 is assigned a score that is indicative of the desirability of the respective completions that the leaf nodes 212-224 represent. As shown in this exemplary trie data structure 200, the leaf node 212 is assigned a score of 4, the leaf node 214 is assigned a score of 5, the leaf node 216 is assigned a score of 6, the leaf node 218 is assigned the score of 3, the leaf node 220 is assigned a score of 6, the leaf node 222 is assigned a score of 7, and the leaf node 224 is assigned a score of 9. Thus, the completion represented by the leaf node 218 is the most desirable completion, the completion represented by the leaf node 212 is the second most desirable completion etc.

Further, the root node 202 and the intermediate nodes 204-210 are assigned scores that equal the best (lowest scores assigned to their respective descendants. As shown, the leaf nodes 218 and 220 are descendants of the intermediate node 208. The lowest score assigned amongst the descendant leaf nodes 218 and 220 is 3; therefore, the intermediate node 208 is assigned a score of 3. Likewise, leaf nodes 222 and 224 are descendant leaf nodes of the intermediate node 210. The lowest score assigned amongst such leaf nodes 222-224 is 7; therefore, the score assigned to the intermediate node 210 is 7. The intermediate node 204 has leaf nodes 218-224 as its descendants, and the lowest score assigned amongst such leaf nodes 218-224 is 3; therefore, the intermediate node 204 is assigned the score of 3. The root node 202 is also assigned a score of 3, as 3 is the lowest score assigned to any of its descendant nodes.

It can thus be ascertained that the returner component 106 can walk appropriate nodes of the trie data structure 200 to locate a most desirable completion by analyzing scores assigned to nodes therein. In an example, the user 104 can proffer the prefix "B". The returner component 106 can locate the intermediate node 204, which represents such prefix. To locate the most desirable completion, the returner component 106 can analyze the scores assigned to the descendants of the intermediate node 204 (scores assigned to intermediate nodes 208 and 210) and can ascertain that leaf nodes beneath the intermediate node 208 are desirably analyzed (as one of such leaf nodes has the lowest score, and therefore represents the most desirably completion). Subsequently, the returner component 106 can go to the leaf node 218, and return the completion "BACP". As the nodes in the trie data structure 200 are sorted according to scores assigned thereto, the returner component 106, when retrieving a top completion, can walk the first child of each node until the leaf node 218 is reached. If it is desirable to retrieve more than one completion, the returner component 106 can keep track of a top threshold number of scores when walking the trie data structure 200.

For instance, if the returner component 106 desirably retrieved the top two completions for the query prefix "B", the returner component 106 can locate the intermediate node 204, which corresponds to the proffered prefix, and walk to its first child (the intermediate node 208). The intermediate node can also analyze the second child (the intermediate node 210), which is the next best score amongst siblings of the intermediate node 208. The score of 7 can be retained by the returner component 106 for tracking purposes. The returner component 106 may then walk to the children of the intermediate node 208 to locate the leaf node 218, which represents a most desirable completion (as such leaf node 218 has the lowest score assigned thereto). The returner component then reviews siblings of the leaf node 218 to ascertain if any of such siblings is assigned a score tower than 7, which is the best score assigned to any descendant leaf nodes of the intermediate node 210. In this example, the returner component 106 walks to the leaf node 220, determines that the score assigned to the leaf node is less than 7, and can therefore determine that the completion represented by the leaf node 220 is the next most desirable completion. The returner component 106, due to the sorting of the nodes of the try data structure 200 according to scores assigned thereto, can return the completions "BACP" and "BACF" without walking to leaf nodes 222 and 224, resulting in faster retrievals.

Figure 3:
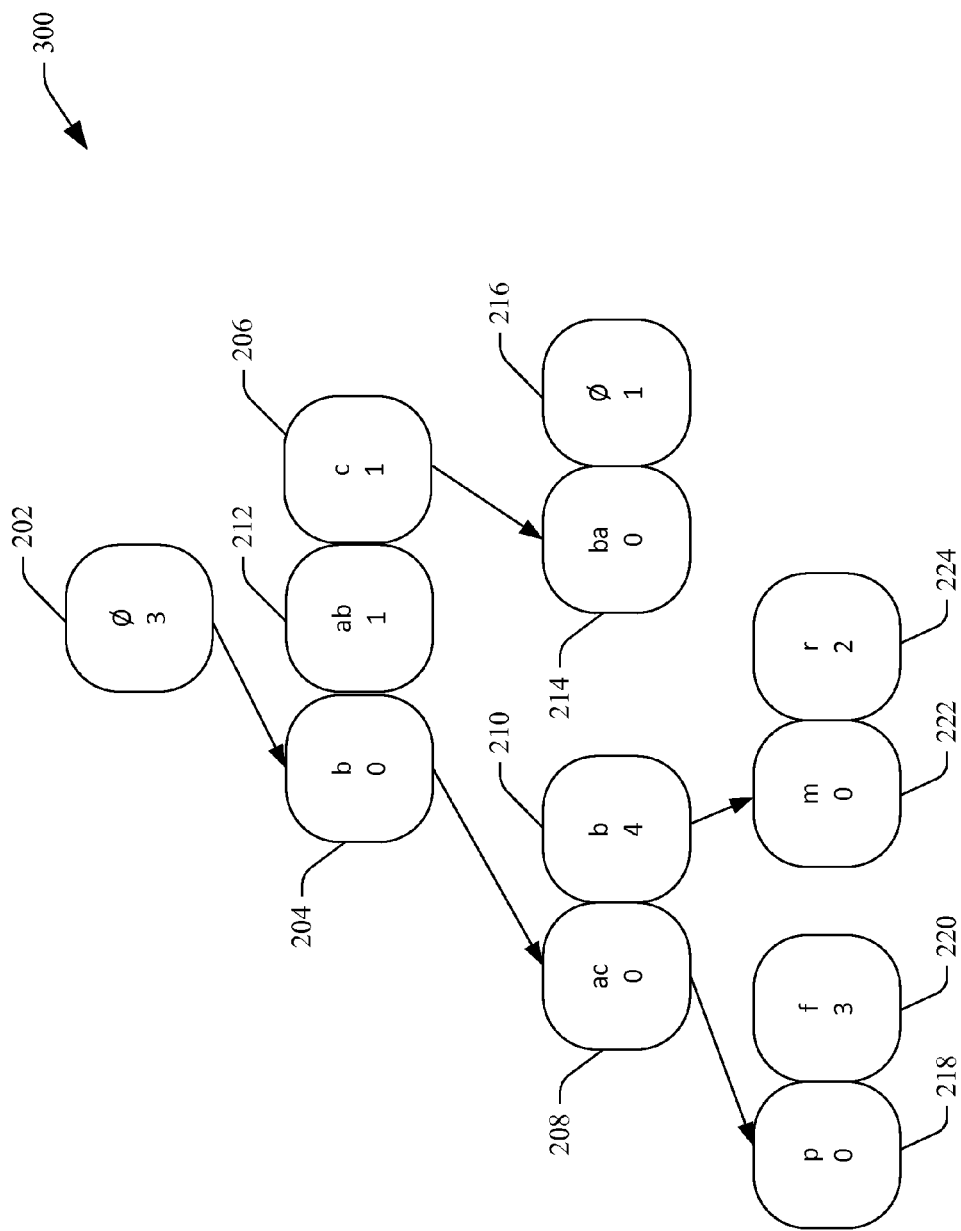
FIG. 3 illustrates another exemplary trie data structure.

Now referring to FIG. 3, an exemplary trie data structure 300 that comprises nodes with differentially encoded scores assigned thereto is illustrated. Completions can be assigned values, for instance, that are indicative of a probability that the completion will be issued by a user as a query based upon data included in query logs. Pursuant to an example, such probabilities can be mapped to contiguous values, which have been referred to herein as "scores". For instance, the scores can be represented by several bytes of data (e.g. one-six bytes). To reduce a number of bytes required to represent scores assigned to particular nodes, differential encoding can be employed. In an example, differential encoding can be undertaken by subtracting the score assigned to a node by the score of its previous sibling in sorted order, or, if the node is the first node amongst its siblings (has the lowest score amongst its siblings), subtracting the score assigned thereto by the score of its parent node. Referring briefly to FIG. 2, original scores assigned to the leaf nodes 218 and 220 is 3 and 6, respectively. Sibling nodes are first sorted in order by increasing scores; since the node 218 is the first node amongst its siblings (has the lowest score assigned thereto amongst its siblings), its differential score is computed by subtracting the score of its parent node 208, resulting in a score of 3−3=0. In general, the score of the first child will always be 0. Since node 220 has node 218 as its previous sibling, its different score is computed by subtracting the score of its previous sibling node 218, resulting in a score of 6−3=3. Likewise, the differential score of node 206 is the difference between node 206 and its previous sibling node 12, or 5−4=1. As can be ascertained, differentially encoding the scores in such a manner causes a relatively large number of scores assigned to nodes in a trie data structure to be driven to 0, meaning that such scores can be represented utilizing zero bytes of data. Similarly, differential encoding can be utilized to encode offsets between nodes. The root node 202 retains its original score, such that original scores assigned to its descendants can be recovered, if desired.

Figure 4:
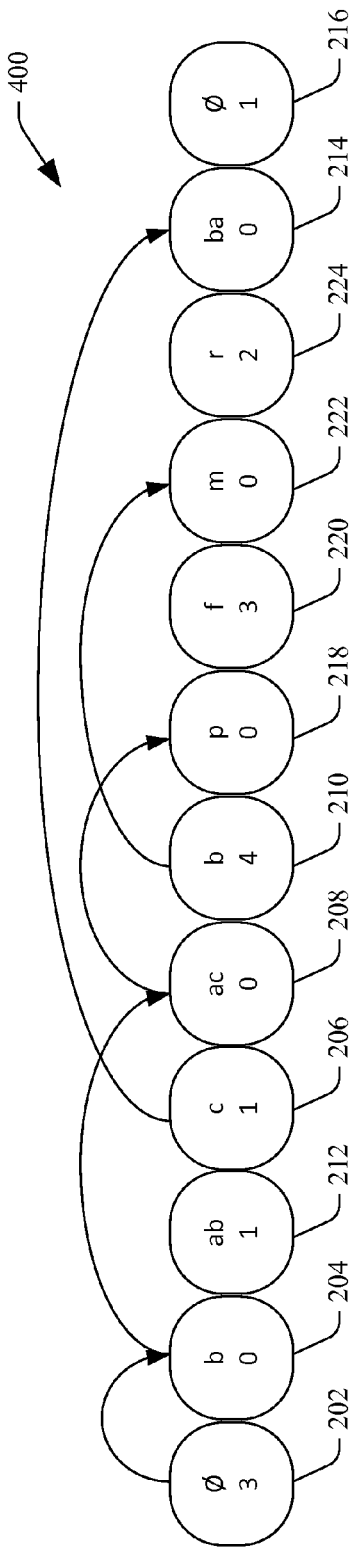
FIG. 4 illustrates an exemplary arrangement of nodes of a trie data structure in memory of a computing device.

Referring now to FIG. 4, an exemplary arrangement 400 of the nodes 202-224 of the trie data structure 300 in computer-readable memory is illustrated. As can be appreciated by reviewing the arrangement 400 of the nodes 202-224, sibling nodes are stored adjacent to one another in memory, and thereafter nodes are stored in depth first order. Accordingly, the root node 202 is stored first in memory, followed by its immediate children 204, 212, and 206 (which are direct descendants from the root node 202 and are siblings of one another). Immediate children of the intermediate node 204 are then placed in memory following the intermediate node 206. Thus, the intermediate node 208 follows the intermediate node 206, and the intermediate node 210 follows the intermediate node 208, as the intermediate nodes 208 and 210 are siblings. The leaf nodes 218 and 220 follow the intermediate node 210 in memory, as the leaf nodes 218 and 220 are children of the intermediate node 208. Since the leaf nodes 218 and 220 have no children, the leaf nodes 222 and 224 (which are children of the intermediate node 210) are positioned next in memory.

If the node 212 of the trie data structure 300 had any children, such children would be placed next in memory. Since, however, the node 212 is a leaf node, the next nodes in memory are the leaf nodes 214 and 216, which are children of the intermediate node 206. It can be ascertained that even though nodes 208, 210, 214, and 216 are at the same level in the trie data structure 300, they are not positioned adjacent to one another in memory, as the intermediate nodes 208 and 210 are siblings and the leaf nodes 214 and 216 are siblings, but the intermediate nodes 208 and 210 are not siblings with the leaf nodes 214 and 216. Depth-first ordering of nodes in memory causes nodes to be placed relatively proximate to their respective parents. Ordering of the nodes in memory in this fashion has two beneficial effects: 1) offsets between a parent node and its children are generally smaller, thereby reducing an amount of space needed to be allocated for offsets between nodes and their children; 2) positioning children nodes in memory close to their parents, particularly when the nodes are ordered based upon scores assigned thereto, results in fewer cache misses. Specifically, as cache lines are typically around 64 bytes in size, when a portion of the trie data structure 300 is loaded into a cache and best completions are desirably found, it is more likely that best completions will remain in the cache line as nodes of the trie data structure 300 are walked by the returner component 106. This increases speed of searches over the trie data structure 300.

Figure 5:
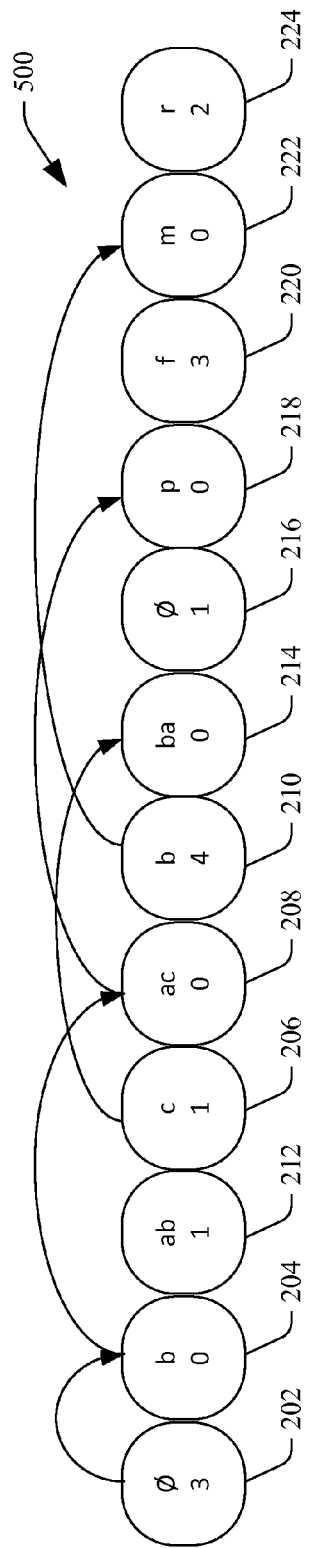
FIG. 5 illustrates another exemplary arrangement of nodes of a trie data structure in memory of a computing device.

With reference now to FIG. 5, another exemplary arrangement 500 of the nodes 202-224 in memory of a computing device is illustrated. In the exemplary arrangement 500, the nodes 202-224 are arranged in memory in breadth-first order, such that all nodes on a same hierarchical level in the trie data structure 300 are adjacent one another in memory. Therefore, the root node 202 is stored first, followed by its children nodes 204, 212, and 206. Thereafter, nodes 208, 210, 214, and 216 are stored adjacent to one another in memory, as they are on the same level of the hierarchy of the trie data structure 300. Such nodes are followed in memory by the nodes 218, 220, 222, and 224. The arrangement 500 is an alternate arrangement to the arrangement 400 depicted in FIG. 4. It can be discerned, however, that in the exemplary arrangements 400 and 500 set forth in FIGS. 4 and 5, respectively, the location of the most desirable completion (represented by the leaf node 218) is positioned more proximate to its parent in the arrangement 400 when compared to its position in memory in the arrangement 500. It is to be understood, however, that either of the arrangements 400 or 500 or some hybrid thereof can be employed in connection with storing a trie data structure in computer-readable storage.

Figure 6:
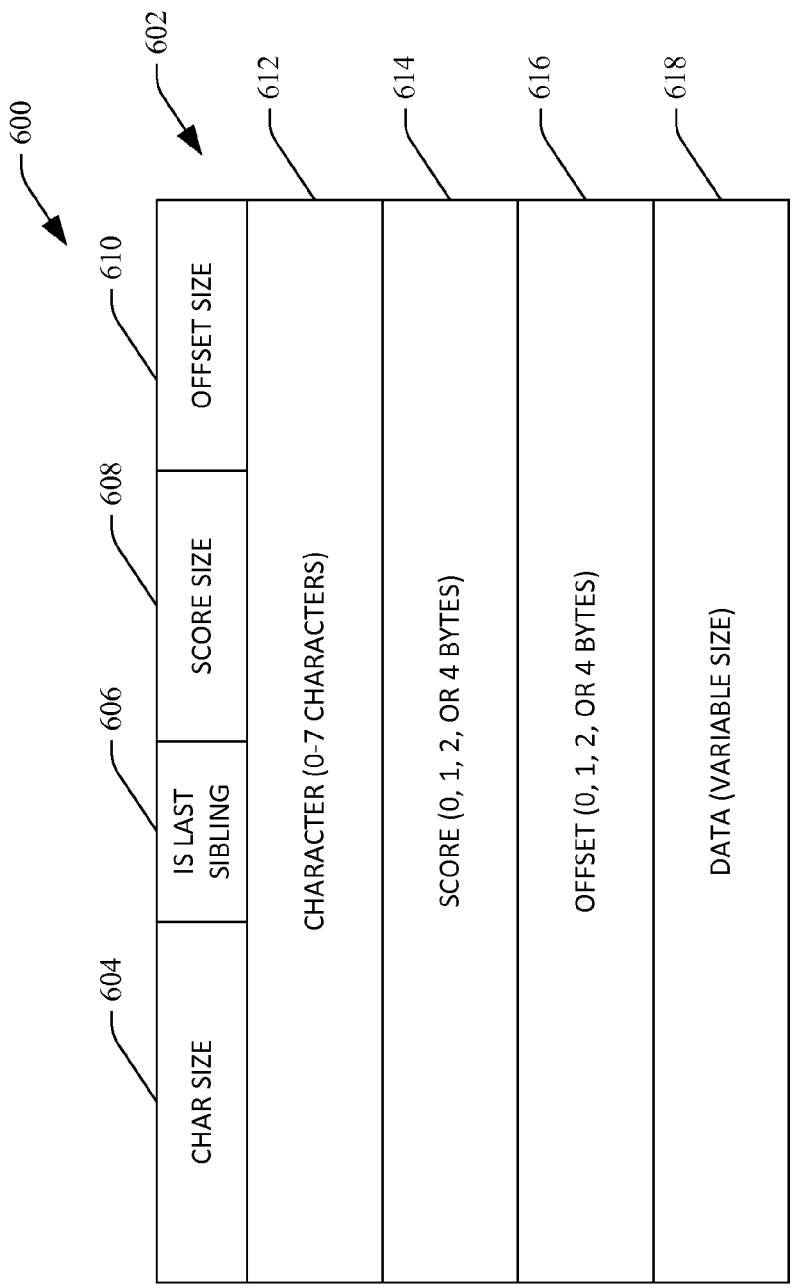
FIG. 6 illustrates exemplary contents of a node in a trie data structure.

Now referring to FIG. 6, an exemplary depiction of contents of a node 600 that can be included in the trie data structure 110 is illustrated. The exemplary node 600 comprises a header 602, which in an exemplary embodiment can be one byte in size. The header 602 comprises a first portion 604, which indicates an amount of storage allocated for alphanumerical character(s) that are included in the node 600. In an example, the first portion 604 may be three bits in size, wherein the bits indicate a number of characters included in the node 600 (0-7 characters). The header 602 can further comprise a second portion 606 that indicates whether the node 600 is a last of a set of siblings, wherein the second portion 606 is one bit in size.

The header 602 further comprises a third portion 608 that indicates a number of bytes utilized to encode a score that is assigned to the node 600. The third portion 608 can be two bits in size, such that 0-4 bytes can be employed to represent the score assigned to the node 600. The header 602 also comprises a fourth portion 610 that indicates a number of bytes included in the node 600 that represent an offset to a child node of the node 600. For instance, the fourth portion 610 may be two bits in size, such that an offset can be 0-4 bytes.

The node 600 further comprises one or more characters 612, wherein, for example, a number of characters can be between zero and seven. It can thus be understood that Patricia trie compression can be employed to cause the nodes 600 to encode a plurality of alphanumerical characters. The node 600 further comprises a score portion 614 that includes a score assigned to the node 600. Such score can be represented utilizing 0, 1, 2, or 4 bytes, for example. It can therefore be ascertained that variable byte encoding is employed with respect to scores assigned to nodes in the trie data structure 110, such that a first node may include zero bytes to represent the score assigned thereto, a second node may include one or more bytes to represent the score assigned thereto, and so forth.

The node 600 also optionally comprises an offset portion 616, which indicates an offset from the node 600 to its first child in memory. If the node is a leaf node and does not contain a child node, then the offset portion 616 will be allocated 0 bytes. As can be ascertained, variable byte encoding can be employed to represent offsets in different nodes, as a first node may include 0 bytes to represent an offset, a second node may include 2 bytes to represent an offset, etc.

The node 600 may optionally include a data portion 618, which can include any suitable data corresponding to the node 600 and may be of any suitable size. In an exemplary embodiment, the data portion 618 can include a pointer to another node in the Erie data structure 110. Pursuant to an example, the node 600 may be a leaf node that represents an improperly spelled completion, and the data portion 618 can include a pointer to another leaf node that represents a corrected spelling of such completion. It is to be understood, however, that the data portion 618 can include a pointer to another leaf node that represents an alternate completion to the completion represented by the node 600. Other data may also be included in the data portion 618.

The structure, including the sorting of nodes and arrangement of nodes in memory, has been described above. Exemplary retrieval operation of the returner component 106 when retrieving one or more completions from the trie data structure 110 will now be described in greater detail. As indicated above, the returner component 106 can receive the prefix from the user 104 and can locate the node in the trie data structure 110 that represents the received prefix. In an exemplary approach, each immediate child of the located intermediate node can be pushed into a priority queue. Subsequently, the immediate child node with the lowest score assigned thereto is retrieved from the priority queue, and such node is expanded such that its immediate children can be analyzed. These children can then be added to the priority queue, and the next immediate child node with the lowest score can be retrieved and expanded. This can continue until the leaf node(s) that are representative of the completion(s) with the lowest score(s) are retrieved by the returner component 106, and the completion(s) represented by the leaf node(s) can be returned to the user 104. Using such approach, children can be enumerated in the order of score assigned thereto, and nodes with relatively high scores are generally not expanded.

It can be ascertained, however, that the above-described operation of the returner component 106 causes many nodes to be added to the priority queue, which can in some instances slow the efforts of the returner component 106 when retrieving completions. In an exemplary embodiment, the returner component 106 can search the trie data structure 110 more efficiently by lazily adding nodes to the priority queue. In other words, instead of immediately adding all children of a node to the priority queue, only a node with a lowest score is added to the priority queue. Its sibling is not added to the priority queue until such node is retrieved from the priority queue. Accordingly, if a node has 100 children, not all 100 children need be added to the priority queue immediately. Instead, the first child node, which has the lowest score amongst all its siblings, is enqueued. When this node is retrieved from the priority queue, its next adjacent sibling (arranged in terms of score s added to the priority queue. Therefore, if the returner component 106 lazily enqueues nodes, descendants are enqueued and sorted one at a time until the returner component 106 determines that a best threshold number of scores have been located (and accordingly a best threshold number of completions have been retrieved).

Figure 7:
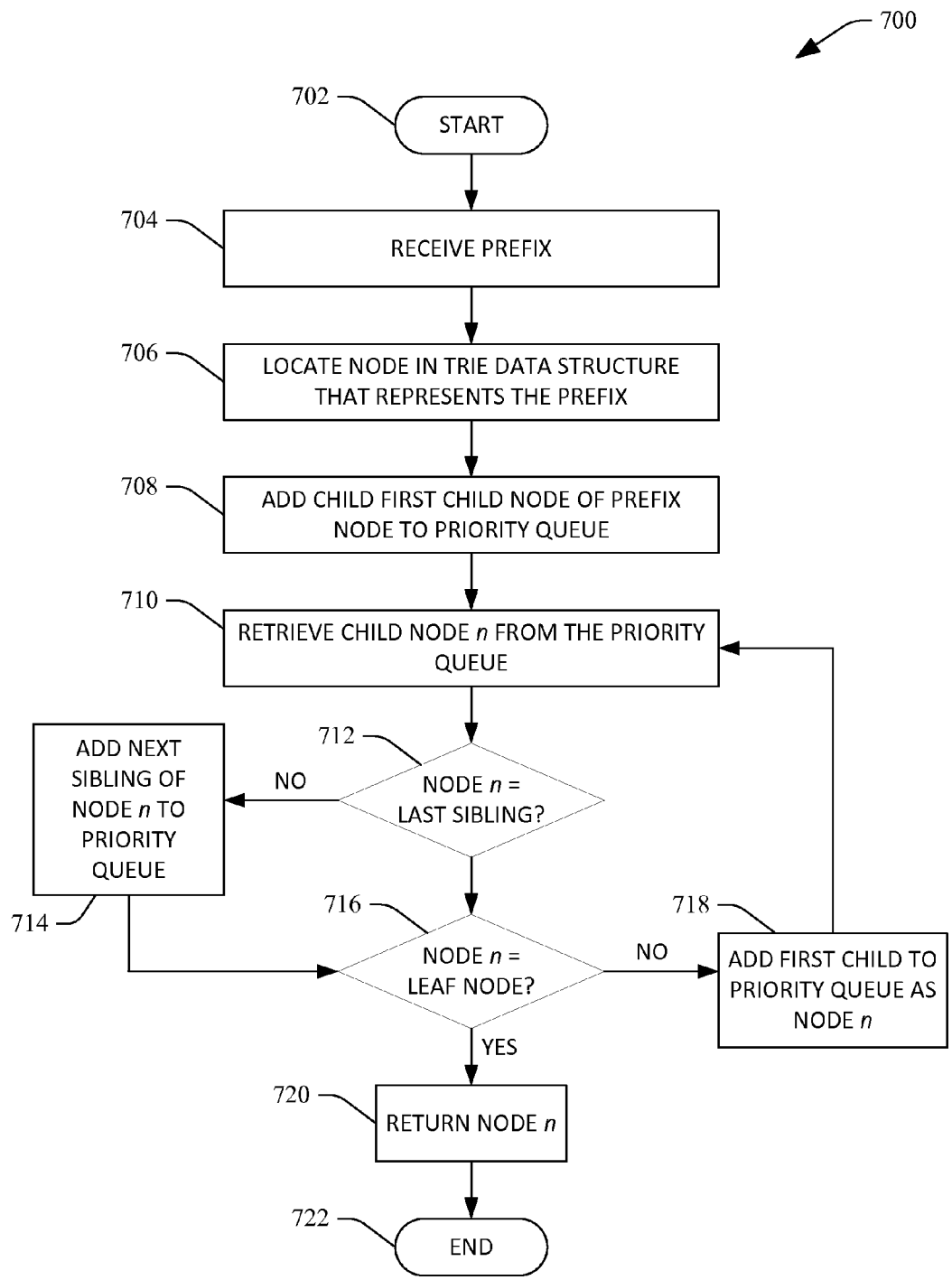
FIG. 7 is a flow diagram that illustrates an exemplary methodology for performing a search over a trie data structure.
Figure 8:
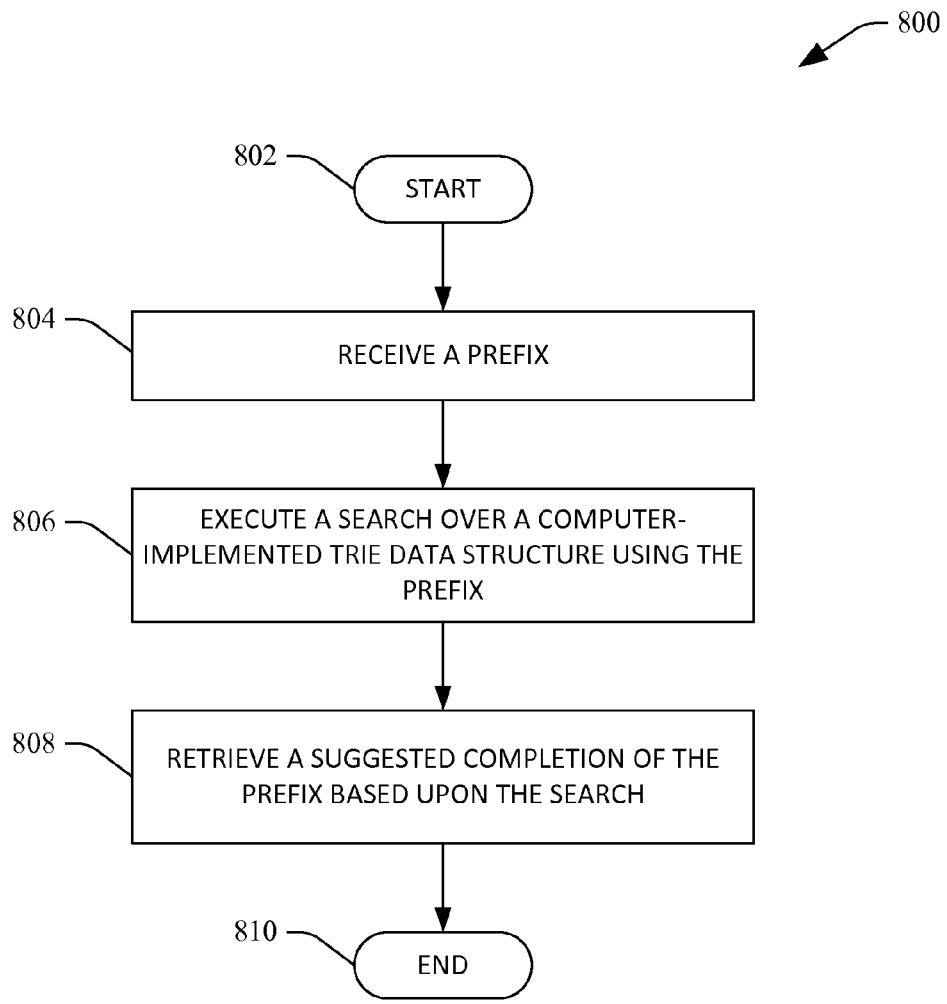
FIG. 8 is a flow diagram that illustrates an exemplary methodology for retrieving a suggested completion of a prefix.

With reference now to FIGS. 7-8, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Referring now to FIG. 7, a flow diagram that illustrates an exempla 7 methodology 700 for walking nodes of a trie data structure is illustrated. The methodology 700 starts at 702, and at 704 a prefix is received from a user. At 706, the trie data structure is accessed responsive to receiving the prefix and a node in the trie data structure that represents the received prefix is located. This node is referred to as the prefix node At 708 the first child node of the prefix node in the trie data structure is added to a priority queue. It can be understood that this child node is the child node of the prefix node that has the lowest score assigned thereto from amongst all children of the prefix node.

At 710, a node n is retrieved (popped) from the priority queue. At 712, a determination is made regarding whether node n is the last sibling amongst all of its siblings (the sibling with the highest score assigned thereto). If the node is not the last sibling, then at 714 the next sibling of node n is added to the priority queue.

If it is determined at 712 that node n is the last sibling, or subsequent to the next sibling node being added to the priority queue, at 716 a determination is made regarding whether node n is a leaf node. If node n is not a leaf node, at 718 the first child of node n is added to the priority queue as node n. Subsequently, node n is retrieved from the priority queue at 710. If at 716, however, it is determined that node n is a leaf node, then at 720 node n is returned and the completion is reconstructed by iteratively finding the child containing the offset of node n from the root node of the trie data structure. The methodology 700 completes at 722.

An exemplary depiction of the methodology 700 in pseudocode is set forth below for purposes of explanation. The exemplary pseudocode is not intended to be limiting as to the scope of the claims. Furthermore, it is to be understood that the methodology 700 and the pseudocode shown below are but one possible algorithm that can be employed to walk nodes of a trie data structure to locate completions corresponding to a prefix proffered by a user.

```
trie.GetCompletions(prefix)
    PriorityQueue q
    Node n = Find(prefix, trie.Root)
    q.Enqueue(n.FirstChild)
    while (!q.IsEmpty)
        n = g.Top
        if (!n.IsLastSibling)
            q.Enqueue(n.NextSibling)
        if (n.IsLeaf)
            yield return n
            g.Dequeue( )
        else
            q.ReplaceTop(n.FirstChild) // FirstChild is guaranteed
to have the same score as n
```

Now referring to FIG. 8, an exemplary methodology 800 pertaining to providing a completion to a prefix responsive to receipt of such prefix is illustrated. The methodology 800 starts at 802, and at 804 a prefix is received, wherein the prefix comprises at least one character.

At 806, a search over a computer-implemented trie data structure is executed using the prefix to retrieve a suggested completion for such prefix. As described above, the trie data structure comprises a root node and a plurality of leaf nodes, wherein the leaf nodes are descendants of the root node. The leaf nodes represent a plurality of respective completions to potential prefixes. Each leaf node in the plurality of leaf nodes has a respective score assigned thereto that is indicative of a desirability of its corresponding completion. The trie data structure also comprises a plurality of intermediate nodes, wherein each intermediate node is a child of the root node is a parent node to at least two leaf nodes. The intermediate nodes correspond to a respective plurality of extensions to one or more potential prefixes, and each intermediate node is assigned a score, the score equaling the lowest score assigned amongst descendant leaf nodes of the respective intermediate node.

At 808, the suggested completion for the prefix is retrieved based upon the search (e.g. by waking nodes of the trie data structure based upon the scores assigned thereto). The methodology 800 completes at 810.

An exemplary process for building the trie data structure 110 is now briefly described. It is to be understood, however, that the trie data structure 110 can be built using any suitable process. First, an input file is generated, wherein the input file comprises one or more character sequences in sorted order and scores assigned thereto. As each character sequence is read in sorted order, portions of the trie can be constructed from bottom up. As all leafs corresponding to an intermediate node are read, the children of this node can be sorted in score order, differential scores and offsets can be computed, and the binary trie representation for this intermediate node can be built. The binary representation of the overall trie can be output after processing all the entries in the file.

Figure 9:
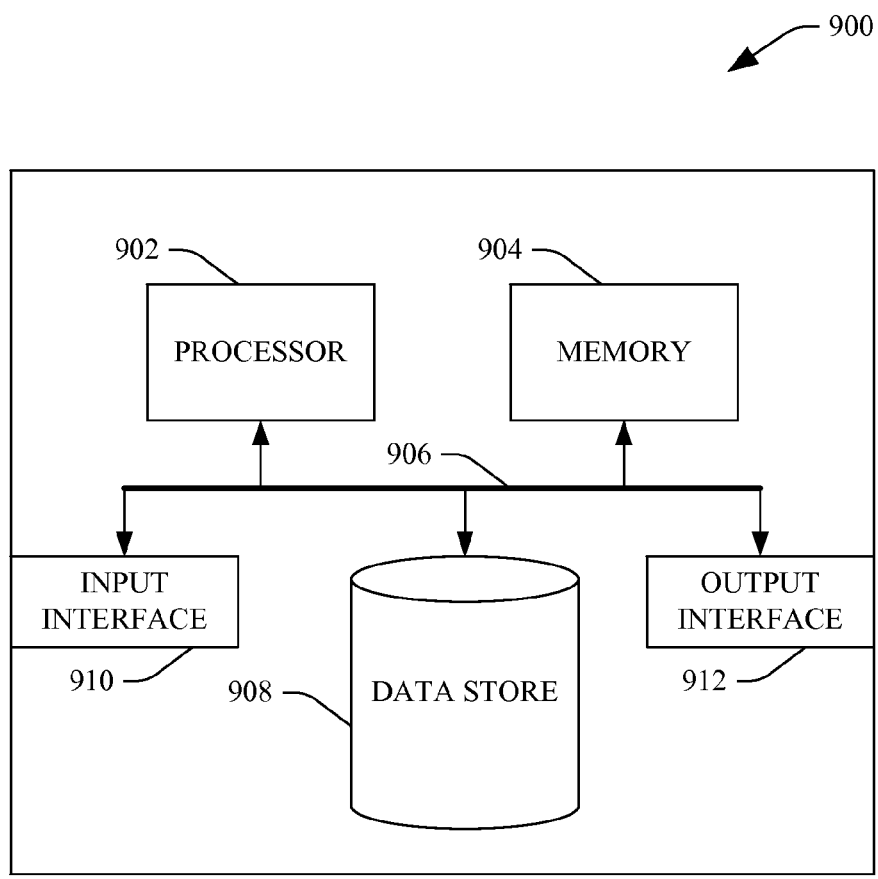
FIG. 9 is an exemplary computing system.

Now referring to FIG. 9, a high-level illustration of an exemplary computing device 900 that can be used in accordance with the systems and methodologies disclosed herein is illustrated. For instance, the computing device 900 may be used in a system that supports retrieving completions responsive to receipt of a prefix. In another example, at least a portion of the computing device 900 may be used in a system that supports walking nodes of a trie data structure. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store a trie data structure, including nodes and their respective contents.

The computing device 900 additionally includes a data store 908 that is accessible by the processor 902 by way of the system bus 906. The data store may be or include any suitable computer-readable storage, including a hard disk, memory, etc. The data store 908 may include executable instructions, nodes, etc. The computing device 900 also includes an input interface 910 that allows external devices to communicate with the computing device 900. For instance, the input interface 910 may be used to receive instructions from an external computer device, a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a computer processor, the method comprising:
   receiving a prefix that comprises at least one character; and
   using the prefix, executing a search over a computer-implemented trie data structure to retrieve a suggested completion for the prefix, the trie data structure comprising:
      a root node;
      a plurality of leaf nodes that are child nodes of the root node, the leaf nodes corresponding to a respective plurality of completions to potential prefixes, each leaf node in the plurality of leaf nodes having a respective score assigned thereto that is indicative of historic frequency of use of its corresponding completion; and
      a plurality of intermediate nodes, wherein each intermediate node is a descendant node of the root node and an ancestor node to at least one leaf node, the intermediate nodes corresponding to a respective plurality of extensions to the potential prefixes, and wherein each intermediate node is assigned a respective score that maps to a highest score assigned to a respective leaf node from amongst all leaf nodes that are child nodes of the respective intermediate node, wherein the suggested completion for the prefix is retrieved by walking nodes of the trie data structure based upon the respective scores assigned thereto.

2. The method of claim 1, wherein the plurality of leaf nodes and the plurality of intermediate nodes are sorted in the trie data structure based upon the respective scores assigned thereto.

3. The method of claim 2, wherein the search is executed over the computer-implemented trie data structure to retrieve a plurality of suggested completions, the plurality of suggested completions retrieved by walking nodes of the trie data structure from an intermediate node corresponding to the prefix.

4. The method of claim 1, wherein executing the search over the trie data structure comprises:
   identifying an intermediate node in the trie data structure that corresponds to the prefix, wherein the intermediate node has a plurality of immediate child nodes that have scores assigned thereto; and
   adding less than all the immediate child nodes to a priority queue when retrieving the completion of the prefix.

5. The method of claim 4, wherein adding less than all the immediate child nodes to the priority queue when retrieving the completion of the prefix comprises:
   adding a first node from the plurality of immediate child nodes of the intermediate node to a priority queue based upon a score assigned thereto;
   retrieving the first node from the priority queue;
   subsequent to retrieving the first node from the priority queue, adding a second node from the plurality of immediate child nodes of the intermediate node to the priority queue based upon a score assigned thereto; and
   retrieving the prefix completion subsequent to retrieving the first node from the priority queue.

6. The method of claim 1, wherein at least one intermediate node in the trie data structure comprises a multiple character extension to the prefix.

7. The method of claim 1, wherein scores assigned to the leaf nodes are encodings of original scores corresponding to completions, wherein the original scores are encoded by way of differential encoding.

8. The method of claim 7, wherein the scores are encoded by way of variable byte encoding, such that different numbers of bytes are employed to represent different scores for different nodes in the trie data structure.

9. The method of claim 1, wherein nodes in the trie data structure are stored in memory such that sibling nodes are stored consecutively in memory and in depth-first order.

10. The method of claim 9, wherein each intermediate node comprises a pointer to its child node with a lowest score assigned thereto from amongst all scores assigned to its children.

11. The method of claim 10, wherein a pointer in an intermediate node is encoded by way of differential encoding.

12. The method of claim 11, wherein the completion is reconstructed from a plurality of extensions to the prefix by way of traversing pointers in nodes of the trie data structure.

13. The method of claim 1, wherein a leaf node comprises a pointer to another leaf node in the trie data structure.

14. A system, comprising:
   at least one processor; and
   memory that comprises a plurality of components that are executed by the at least one processor, the plurality of components comprises:
      a receiver component that receives a prefix set forth by a user; and a returner component that returns a suggested completion for the prefix responsive to receiving the prefix, the returner component selecting the suggested completion from amongst a plurality of potential completions by walking nodes of a trie data structure based upon scores respectively assigned to the nodes that are indicative of probabilities that the completions will be selected, the trie data structure comprising:
- a plurality of leaf nodes, wherein each of the leaf nodes is representative of a respective potential completion, and wherein each of the leaf nodes is assigned a score that is indicative of a respective probability that the completion will be selected; and
- at least one intermediate node that is a parent to the plurality of leaf nodes, the at least one intermediate node representative of a potential extension to the prefix and being assigned a score that equals a score assigned to a leaf node in the plurality of leaf nodes, the leaf node in the plurality of leaf nodes being representative of a most probable potential completion from amongst potential completions represented by the plurality of leaf nodes.

15. The system of claim 14, wherein the prefix is a query prefix set forth to a search engine by the user and the suggested completion is a query completion.

16. The system of claim 14, wherein the prefix is proffered to a URL field of a browser, and wherein the suggested completion is a URL to a web page.

17. The system of claim 14, wherein the plurality of leaf nodes are ordered beneath the intermediate node based upon scores assigned to the plurality of leaf nodes.

18. The system of claim 14, wherein at least one leaf node in the plurality of leaf nodes comprises a pointer to another leaf node, the another leaf node being representative of an alteration to a completion represented by the at least one leaf node.

19. The system of claim 14, wherein the trie data structure comprises a plurality of intermediate nodes, each of the intermediate nodes having a plurality of child nodes, and wherein sibling nodes in the trie data structure are stored in memory adjacent to one another, and wherein nodes in the trie structure are stored in the memory in depth-first order.

20. A computer-readable medium comprising instructions that, when executed by a processor, cause the processor to perform acts comprising:
- receiving a prefix set forth by a user, the prefix comprising a plurality of alphanumerical characters;
- executing a search over a trie data structure responsive to receiving the prefix, wherein the trie data structure comprises:
  - an intermediate node, the intermediate node comprising at least one character that is a potential extension to the prefix and a pointer, the intermediate node having a first score assigned thereto; and
  - a plurality of leaf nodes that are children of the intermediate node, the leaf nodes representing potential completions of the prefix, each of the leaf nodes assigned a respective score that is indicative of probability of a respective potential completion, wherein a first leaf node in the plurality of leaf nodes that is representative of a most probable potential completion is assigned the first score, wherein the pointer in the intermediate node points to the first leaf node, and wherein the plurality of leaf nodes are ordered in memory of a computing device based upon the scores assigned thereto; and
- returning the most desirable probable completion as a suggested completion to the prefix.

* * * * *